(12) United States Patent
Matsumura et al.

(10) Patent No.: US 7,483,189 B2
(45) Date of Patent: Jan. 27, 2009

(54) HOLOGRAPHIC MEMORY MEDIUM, HOLOGRAPHIC MEMORY DEVICE AND HOLOGRAPHIC RECORDING DEVICE

(75) Inventors: Yoshiyuki Matsumura, Gifu (JP); Ian Russell Redmond, Boulder, CO (US); Keith Malang, Longmont, CO (US)

(73) Assignees: Sanyo Electric Co., Ltd., Osaka (JP); Inphase Technologies, Longmont, CO (US)

( * ) Notice: Subject to any disclaimer, the term of this patent is extended or adjusted under 35 U.S.C. 154(b) by 147 days.

(21) Appl. No.: 11/378,395

(22) Filed: Mar. 20, 2006

(65) Prior Publication Data

US 2007/0216981 A1  Sep. 20, 2007

(51) Int. Cl.
*G03H 1/10* (2006.01)
*G03H 1/02* (2006.01)

(52) U.S. Cl. .................... 359/10; 359/28; 359/3
(58) Field of Classification Search .......... 359/24
See application file for complete search history.

(56) References Cited

U.S. PATENT DOCUMENTS

| | | | | |
|---|---|---|---|---|
| 5,777,760 | A * | 7/1998 | Hays et al. | 359/7 |
| 5,978,112 | A * | 11/1999 | Psaltis et al. | 359/22 |
| 6,721,076 | B2 * | 4/2004 | King et al. | 359/35 |
| 2006/0114792 | A1 * | 6/2006 | Uno et al. | 369/103 |
| 2006/0146386 | A1 * | 7/2006 | Yamatsu et al. | 359/25 |
| 2006/0187510 | A1 * | 8/2006 | Kanaoka | 359/35 |

FOREIGN PATENT DOCUMENTS

| | | |
|---|---|---|
| CN | CN 1193390 A | 9/1998 |
| JP | 11-016374 | 1/1999 |
| JP | 2000-338846 | 12/2000 |

OTHER PUBLICATIONS

Chinese Office Action, w/English translation thereof, issued in Patent Application No. 200710088172.9 dated on Aug. 8, 2008.

* cited by examiner

*Primary Examiner*—Stephone B. Allen
*Assistant Examiner*—Jade Callaway
(74) *Attorney, Agent, or Firm*—McDermott Will & Emery LLP

(57) ABSTRACT

Even when a tilt error is caused in a holographic memory in a direction perpendicular to a surface including optical axes of a signal beam and a reference beam, the signal beam and the reference beam are allowed to enter the holographic memory at adequate angles relative thereto at all times by suppression of the tilt error. During recording and reproducing operations, the reference incident angle of the reference beam in the radial tilt direction is detected based on a received light state. A tilt actuator for displacing the holographic memory medium in the radial tilt direction is driven to adjust an incident angle of the reference beam in the radial tilt direction to the reference angle Sr. Then, the signal beam and the reference beam are emitted to the holographic memory medium to execute the recording and reproducing operations.

2 Claims, 12 Drawing Sheets

FIG. 8
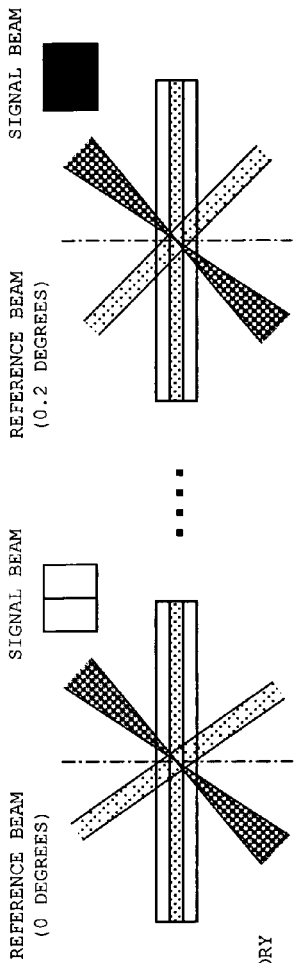
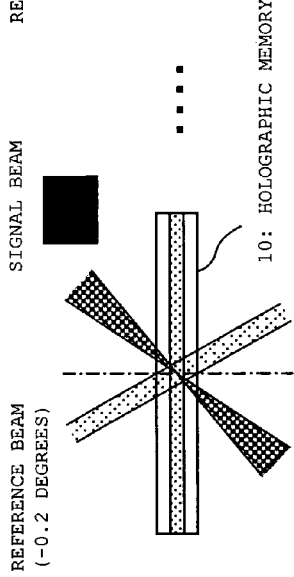
| TANGENTIAL TILT ANGLE | "1" DATA RATIO OF SIGNAL BEAM | MODULATION PATTERN OF SIGNAL BEAM |
|---|---|---|
| -0.20 | 0/20 | |
| -0.19 | 1/20 | |
| ... | ... | |
| -0.01 | 19/20 | |
| 0 | 20/20 | |
| +0.01 | 19/20 | |
| ... | ... | |
| +0.19 | 1/20 | |
| +0.20 | 0/20 | |

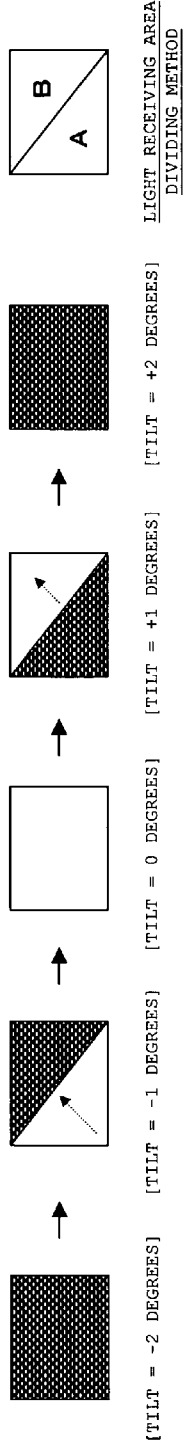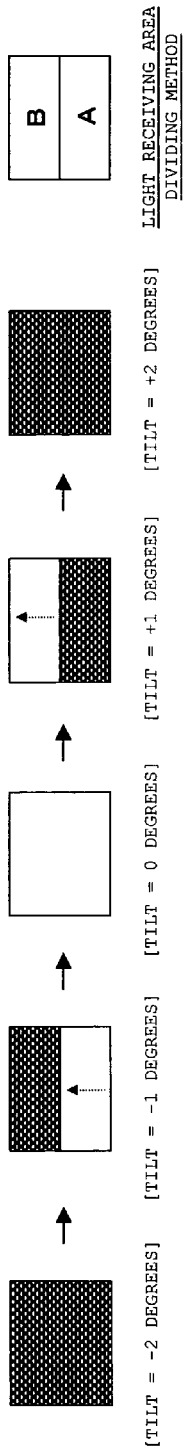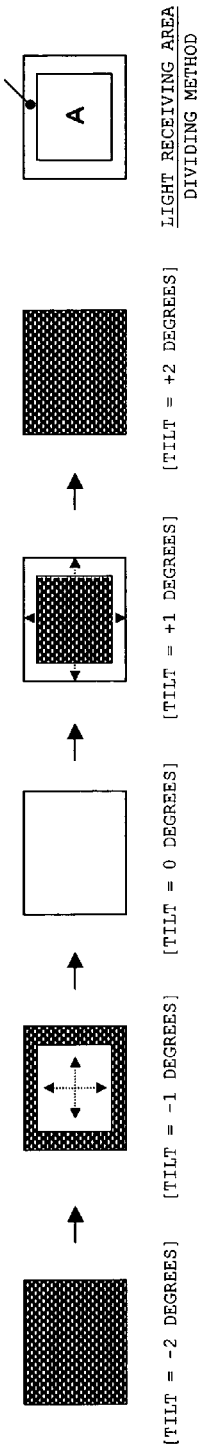

DURING DATA RECORDING

DURING DATA REPRODUCTION (TILT OCCUR)

HOLOGRAPHIC MEMORY MEDIUM, HOLOGRAPHIC MEMORY DEVICE AND HOLOGRAPHIC RECORDING DEVICE

BACKGROUND OF THE INVENTION

1. Field of the Invention

The present invention relates to a holographic memory medium on which information is recorded by fixing interference fringes generated when a signal beam interferes with a reference beam therein, a holographic memory device for recording and reproducing the information in and from the holographic memory medium, and a holographic recording device for recording the information in the holographic memory medium. In particular, the present invention is suitable to correct a tilt error caused between the holographic memory medium and the reference beam.

2. Description of the Related Art

Generally, in the holographic memory, information is recorded by fixing an interference fringe, which is generated by an interference caused therein between a signal beam and a reference beam, in a holographic memory material layer. In this case, the signal beam is subjected to spatial light modulation according to the information to be recorded. Therefore, when the signal beam and the reference beam are applied to the holographic memory, a bright and dark interference fringes are generated in the holographic memory material layer according to the information to be recorded. A highly polymeric monomer in the holographic memory material layer is drawn to a "bright" area of the interference fringes to be polymerized, thereby fixing a refractive index distribution in the holographic memory material layer corresponding to the interference fringe. As a result, information is recorded on the holographic memory.

It is known that in the holographic memory, plural kinds of information can be simultaneously recorded in one recording area (recording block) by changing an incident angle of the reference beam with respect to the holographic memory material layer (angular multiplexing). In other words, the reference beam made incident at different angle for each different piece of information to spatially modulate the signal beam, to thereby make it possible to fix interference fringes corresponding to each different piece of information independently of one another according to their incident angles on the same recording area.

During reproduction, the reference beam is applied to the holographic memory material layer at the same angle at which the reference beam is applied during the recording. Thus, diffraction occurs in the reference beam according to the interference fringe of the angle, and the diffracted reference beam is received by a photoreceptor element to reproduce the information recorded at the angle.

JP 11-16374 A and JP 2000-338846 A each describe a holographic memory device based on angular multiplexing.

In a case of recording information by angular multiplexing, generally, an incident angle of a reference beam with respect to a holographic material layer is changed in an in-plane direction of a surface including the optical axes of the signal beam and the reference beams. Thus, even when a tilt error occurs between the holographic memory and the reference beam in the in-plane direction during reproduction, the incident angle of the reference beam with respect to the holographic memory can be adjusted to a proper state through controlling an actuator (galvano mirror or the like) for adjusting the reference beam according to the tilt error.

For example, as shown in FIG. 12A, when an interference fringe is generated in the holographic memory material layer, even if a tilt occurs in a plane along the line X-Y in FIG. 12A in the holographic memory during reproduction, the reference beam actuator is driven and controlled to correct the incident angle of the reference beam as shown in FIG. 12B, to thereby make the reference beam to be incident on the holographic memory at a proper angle.

However, when the tilt error is caused in a direction perpendicular to the surface including the optical axes of the signal beam and the reference beam, that is, when the tile error is caused in an in-plane direction of the X-Z plane shown in FIGS. 12A and 12B, the tilt error cannot be corrected by drive control of the actuator for reference beam. In such a case, an angle between the interference fringe and the reference beam is different from that at the time of recording, so it is impossible to obtain an adequate reproduction signal.

SUMMARY OF THE INVENTION

The present invention has been made to solve the above-mentioned problem. An object of the present invention is to be able to adequately record and reproduce information in and from a holographic memory by correction of a tilt error even when the tilt error is caused in the holographic memory in a direction perpendicular to a surface including optical axes of a signal beam and a reference beam.

A first aspect of the present invention relates to a holographic memory medium, on which reference information for specifying an incident angle of a reference beam or incident angles of the reference beam and a signal beam in a predetermined direction is recorded based on a hologram principle.

In the first aspect of the present invention, the reference information may be recorded on the holographic memory medium by multiple-recording plural kinds of signal patterns changed depending on an angle in an area while the angle is changed in the predetermined direction.

More specifically, the reference information may be recorded on the holographic memory medium by changing the incident angles of the reference beam and the signal beam in the predetermined direction to multiple-record the plural kinds of signal patterns in the area while the incident angles of the reference beam and the signal beam in an in-plane direction of a surface including optical axes of the reference beam and the signal beam are held.

Further, in the first aspect of the present invention, the reference information may be recorded on the holographic memory medium by recording a kind of signal pattern in an area while an angle in the predetermined direction is held.

More specifically, the reference information may be recorded on the holographic memory medium by holding the incident angles of the reference beam and the signal beam in the predetermined direction to record the kind of signal pattern in the area, while the incident angles of the reference beam and the signal beam in an in-plane direction of a surface including optical axes of the reference beam and the signal beam are held.

Further, in the holographic memory medium of the first aspect of the present invention, first reference information for specifying an incident angle of an emitted laser beam in a first direction and second reference information for specifying an incident angle of an emitted laser beam in a second direction different from the first direction may be recorded in positions different from each other based on the hologram principle.

More specifically, the first direction is an in-plane direction of a surface including optical axes of the reference beam and the signal beam and the second direction is an in-plane direction of a surface perpendicular to the surface including the optical axes of the reference beam and the signal beam.

In this case, the first reference information may be recorded on the holographic memory medium by multiple-recording plural kinds of signal patterns changed depending on an angle in a first area while the angle is changed in the first direction and the second reference information may be recorded on the holographic memory medium by multiple-recording plural kinds of signal patterns changed depending on an angle in a second area while the angle is changed in the second direction.

A second aspect of the present invention relates to a holographic memory device for recording information on a holographic memory medium and/or reproducing information from the holographic memory medium, the holographic memory medium including reference information for specifying an incident angle of a reference beam or incident angles of the reference beam and a signal beam in a predetermined direction, the reference information being recorded based on a hologram principle.

The holographic memory device according to the second aspect of the present invention is characterized by including: detecting means for detecting the incident angle of the reference beam which is specified by the reference information by emitting the reference beam to a recording position of the reference information; and angle adjusting means for adjusting the incident angle of the reference beam or the incident angles of the reference beam and the signal beam relative to the holographic memory medium based on the incident angle detected by the detecting means.

According to one mode of the second aspect of the present invention, the reference information is recorded on the holographic memory medium by multiple-recording the plural kinds of signal patterns changed depending on an angle in an area while the angle is changed in the predetermined direction. In this case, the detecting means detects the incident angle of the reference beam which is specified by the reference information based on corresponding relations between light receiving states of the photo detector when the reference beam is emitted to a recording position of the reference information at incident angles changed in the predetermined direction and the plural kinds of signal patterns.

Further, according to another mode of the second aspect of the present invention, the reference information is recorded on the holographic memory medium by recording a kind of signal pattern in an area while an angle in the predetermined direction is held. In this case, the detecting means checks light receiving states of the photo detector when the reference beam is emitted to a recording position of the reference information at incident angles changed in the predetermined direction and detects an incident angle associated with a maximum received light quantity in the photo detector as the incident angle of the reference beam which is specified by the reference information.

A third aspect of the present invention relates to a holographic recording device, including recording means for recording reference information for specifying an incident angle of a reference beam or incident angles of the reference beam and a signal beam in a predetermined direction in a holographic memory medium including a recording layer by interference between the reference beam and the signal beam in the recording layer.

According to one mode of the third aspect of the present invention, the reference information is recorded on the holographic memory medium by multiple-recording plural kinds of signal patterns changed depending on an angle in an area while the angle is changed in the predetermined direction.

Further, according to another mode of the third aspect of the present invention, the reference information is recorded on the holographic memory medium by recording a kind of signal pattern in an area while an angle in the predetermined direction is held.

According to the present invention, when the reference beam is emitted to the recording position of the reference information, it is possible to detect the incident angle of the reference beam which is specified by the reference information. Therefore, when the incident angle of the reference beam relative to the holographic memory medium or the incident angles of the reference beam and the signal beam relative thereto is/are adjusted based on the detected incident angle, the reference beam or the reference beam and the signal beam can be allowed to enter the holographic memory medium at adequate constant angle(s) during recording and reproducing operations.

BRIEF DESCRIPTION OF THE DRAWINGS

The above-mentioned and other objects of the present invention and the novel features thereof will be more completely clear when the following descriptions of the embodiments are read with reference to the accompanying drawings.

FIG. 8 shows a method of forming an St-reference tilt hologram in Embodiment 2 of the present invention;

FIGS. 11A to 11C show modified examples of the reference tilt holograms in the embodiments.

Note that the drawings are exclusively for the descriptions and thus a scope of the present invention is not limited thereby.

DETAILED DESCRIPTION OF PREFERRED EMBODIMENTS

Hereinafter, embodiments of the present invention will be described with reference to the drawings.

Embodiment 1

Figure 1:
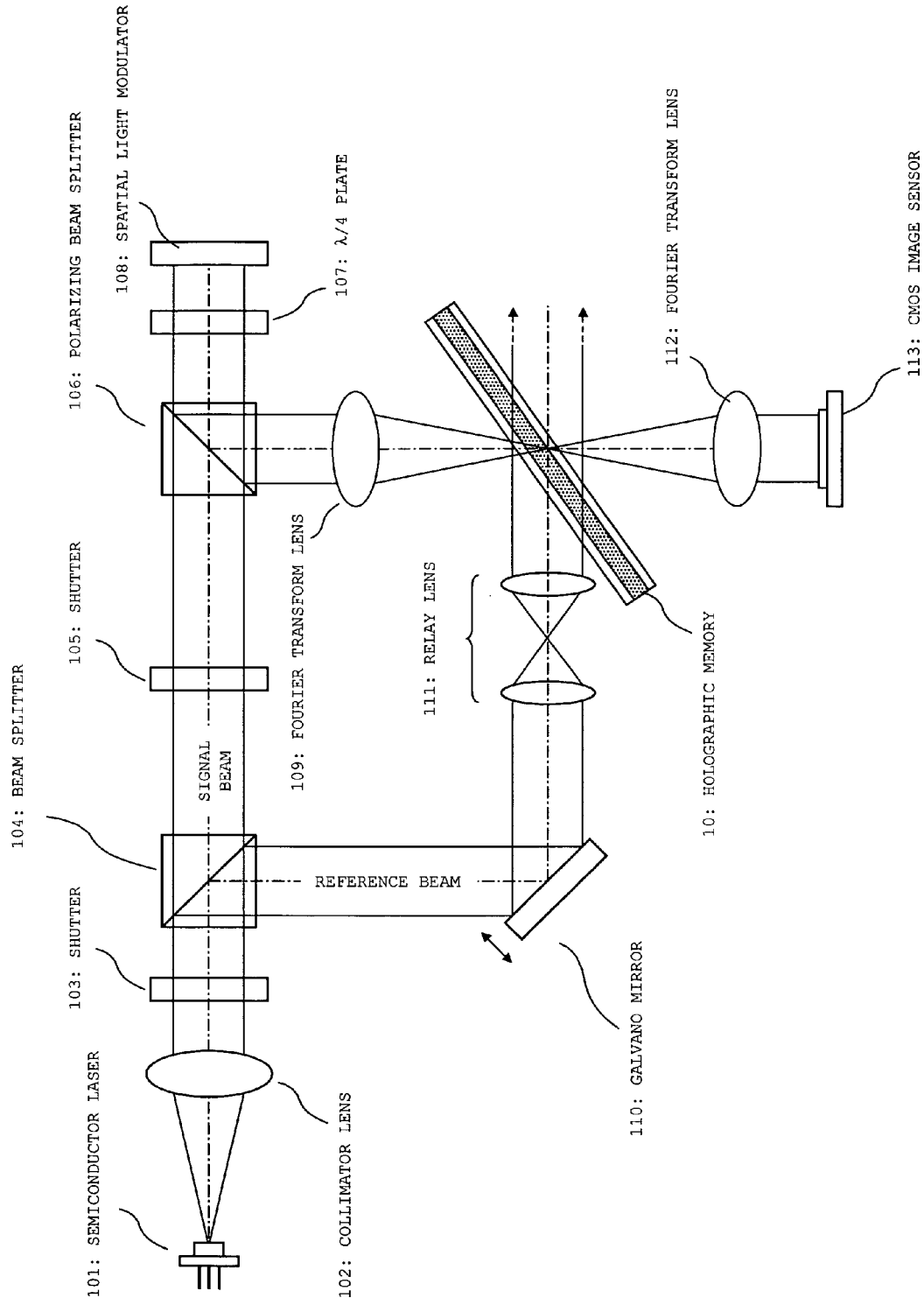
FIG. 1 shows an optical system of a holographic memory device according to Embodiment 1 of the present invention.

FIG. 1 shows an optical system of a holographic memory device according to this embodiment of the present invention.

The shown optical system is used when information is recorded/reproduced in a transmissive holographic memory 10.

As shown in FIG. 1, this optical system includes a semiconductor laser 101, a collimator lens 102, a shutter 103, a beam splitter 104, a shutter 105, a polarizing beam splitter 106, a λ/4 plate 107, a spatial light modulator 108, a Fourier transform lens 109, a galvano mirror 110, a relay lens 111, and a Fourier transform lens 112, and a CMOS (Complementary MOS) image sensor 113.

The semiconductor laser 101 emits a laser beam of a wavelength suited to the holographic memory 10. The collimator lens 102 converts the laser beam made incident from the semiconductor laser 101 into a parallel beam. The shutter 103 includes a mechanical shutter or the like, and passes/blocks a laser beam according to a control signal. Specifically, an OFF (passing) state is set only at the time of exposure of a recording/reproducing operation. Based on time of the OFF state, exposure time for the holographic memory 10 is controlled. The beam splitter 104 splits the laser beam from the collimator lens 102 into signal and reference beams.

The shutter 105 includes a mechanical shutter or the like, and passes/blocks a signal beam according to a control signal. Specifically, an OFF (passing) state is set during recording, while an ON (blocking) state is set during reproduction.

The polarizing beam splitter 106 roughly fully passes a signal beam made incident from the shutter 105, and a signal beam made incident from the λ/4 plate 107. The λ/4 plate 107 converts the signal beam made incident from the polarizing beam splitter 106 from a linear polarized beam into a circular polarized beam, and a signal beam of a circular polarized beam made incident from the spatial light modulator 108 into a linear polarized beam.

The spatial light modulator 108 includes a combination of a liquid crystal panel and a reflection mirror, or the like, and controls a polarized state of a signal beam for each pixel according to a recording signal (binary data of 1 and 0), thereby subjecting the signal beam to spatial light modulation according to the recording signal.

A P-polarized signal beam which has passed through the polarizing beam splitter 106 is circularly polarized to turn left or right by the λ/4 plate 107. In this case, a turning direction of the signal beam is decided by a crystal axis direction of the λ/4 plate 107. For example, when the turning direction of the signal beam is right, the signal beam is reciprocated through the liquid crystal panel of the spatial light modulator 108 to keep its right turning in a pixel position of digital data "1", and to change to left turning in a pixel position of digital data "0". Accordingly, the signal beam passes again through the λ/4 plate 107 to be S-polarized beam in the pixel position of the digital data "1" and to be P-polarized beam in the pixel position of the digital data "0". Of these beams, the S-polarized beam alone with respect to the digital data "1" is reflected by the polarizing beam splitter 106, while the P-polarized beam with respect to the digital data "0" passes through the polarizing beam splitter 106.

The Fourier transform lens 109 converges the signal beam made incident from the polarizing beam splitter 106 on the holographic memory material layer in the holographic memory 10.

The galvano mirror 110 reflects a reference beam, and is rotated in an in-plane direction including optical axes of the signal and reference beams according to a control signal. An incident angle of the reference beam with respect to a recording block is adjusted by rotating the galvano mirror 110. The relay lens 111 guides the reference beam reflected by the galvano mirror 110 to the recording block of the holographic memory 10.

The Fourier transform lens 112 transforms the reference beam diffracted by the holographic memory material layer and passed through the holographic memory 10 (reference beam after passage through the holographic memory 10 will be particularly referred to as "reproduced beam", hereinafter) into a parallel beam, and guides it to the CMOS image sensor 113. The CMOS sensor 113 outputs an electric signal to a signal amplification circuit (described below) according to an intensity distribution of the reproduced beam received through the Fourier transform lens 112.

During recording, the laser beam emitted from the semiconductor laser 101 is transformed into a parallel beam by the collimator lens 102, then passes through the shutter 103, and is split into signal and reference beams by the beam splitter 104. Of these beams, the signal beam passes through the shutter 105, then is transmitted through the polarizing beam splitter 106, and is modulated by the spatial light modulator 108. The signal beam modulated by the spatial light modulator 108 is reflected by the polarizing beam splitter 106, and is converged and applied to the holographic memory 10 by the Fourier transform lens 109. The reference beam is reflected by the galvano mirror 110, and then made incident through the relay lens 111 on a signal beam applied position of the holographic memory 10.

In this way, the signal and reference beams are applied on the holographic memory material layer of the holographic memory 10. Accordingly, an interference fringe is generated in a laser beam applied place of the holographic memory material layer, and a monomer is polymerized according to this interference fringe. As a result, a refractive index distribution is fixed on the hologram material layer according to the interference fringe to execute recording in the holographic memory.

Note that, during recording by angular multiplexing, the galvano mirror 110 is rotated by a predetermined angle (the amount of page feeding) to change the incident angle of the reference beam on the holographic memory 10. At this time, the reference beam reflected by the galvano mirror 10 passes through the relay lens 111 so that it is applied to an applied position of the signal beam by changing an angle alone with respect to the holographic memory 10 without changing the incident position on the holographic memory 10. A recording signal of a next page is supplied to the spatial light modulator 108 according to the angle changing of the reference beam. The angle changing of the reference beam and the changing of the recording signal with respect to the spatial light modulator 108 are repeated until the end of multiple recording in the recording block. Thus, interference fringes different from incident angle to angle of the reference beam are generated in the recording block, whereby a refractive index distribution is fixed in the recording block according to the different interference fringes. As a result, different recording signals are recorded in the recording block by angular multiplexing.

During reproduction, the laser beam emitted from the semiconductor laser 101 is converted into a parallel beam by the collimator lens 102, passes through the shutter 103, and is split into signal and reference beams by the beam splitter 104. Of these beams, the signal beam is blocked by the shutter 105. On the other hand, the reference beam is applied to the holographic memory material layer of the holographic memory 10 through the galvano mirror 110 and the relay lens 111.

Subsequently, the reference beam is diffracted by the interference fringe fixed on the holographic memory material layer to pass through the holographic memory 10. Then, the reference beam (reproduced beam) is transformed into a parallel beam by the Fourier transform lens 112 to be made incident on the CMOS image sensor 113.

The CMOS image sensor 113 outputs an electric signal to the signal amplification circuit (described below) according to an intensity distribution of the received reproduced beam. Here, the intensity distribution of the reproduced beam received by the CMOS image sensor 113 is compliant with the spatial light modulation applied to the signal beam by the spatial light modulator 108 during the recording. Note that the CMOS image sensor 113 is adjusted for a position of a direction parallel to a photodetecting surface and an angle by an adjusting mechanism (not shown). The electric signal output from the CMOS image sensor 113 is amplified by the signal amplification circuit, and then is demodulated by a decoder.

Note that, during the recording and reproducing operations, processing of compensating for a tilt error of the reference beam with respect to the holographic memory 10 is executed. This processing will be described in detail below by referring to FIGS. 5 through 7.

Figure 2:
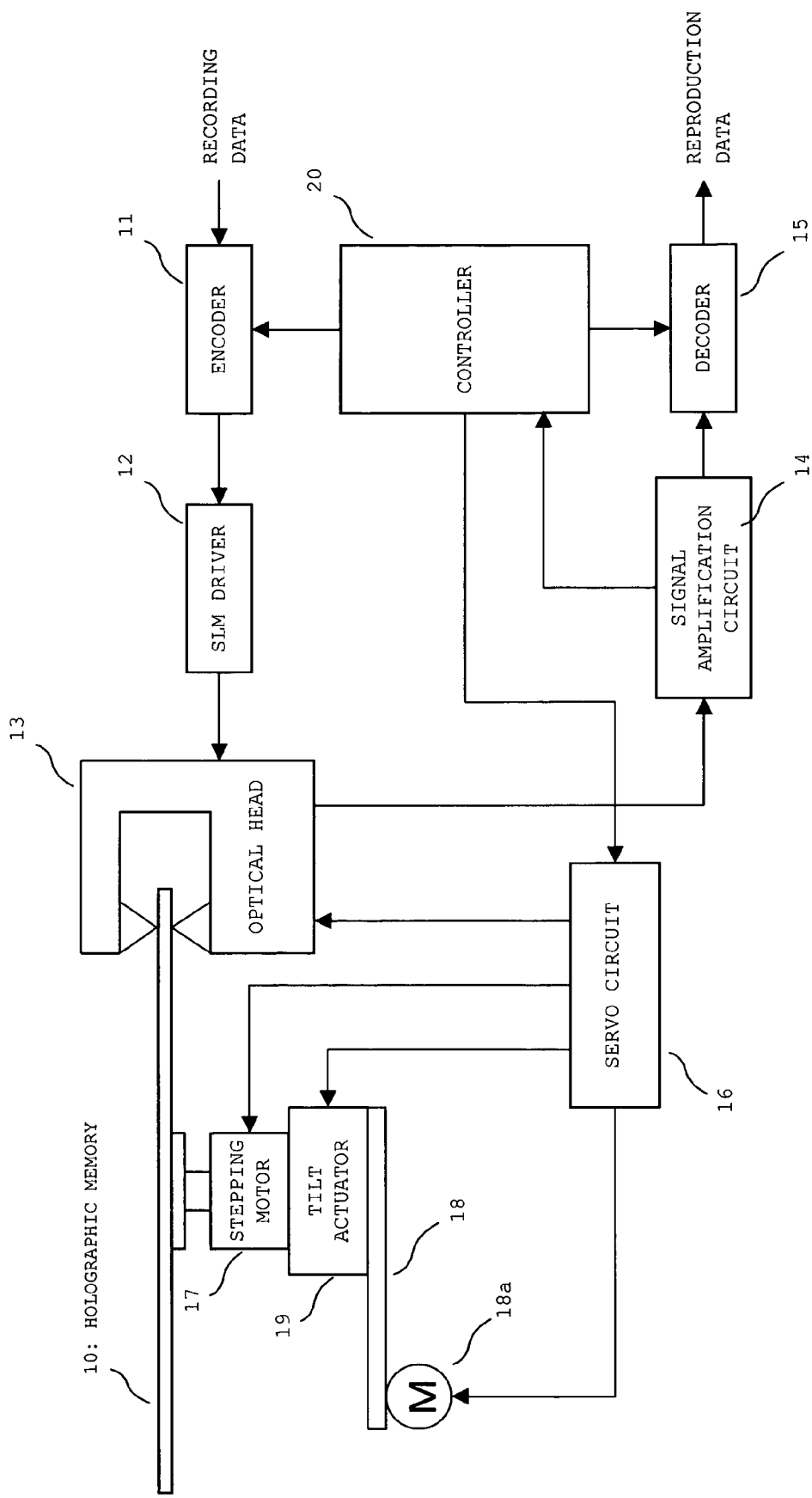
FIG. 2 is a structural diagram showing the holographic memory device according to Embodiment 1 of the present invention.

FIG. 2 is a diagram showing a configuration of the holographic memory device according to this embodiment. As shown in FIG. 2, the holographic memory device includes an encoder 11, an SLM driver 12, an optical head 13, a signal amplification circuit 14, a decoder 15, a servo circuit 16, a stepping motor 17, a feed mechanism 18, a tilt actuator 19, and a controller 20.

The encoder 11 encodes recording data to send it to the SLM driver 12. The SLM driver 12 generates a recording signal from the encoded recording data to drive the spatial light modulator 108, and drives the spatial light modulator 108 in the optical head 13 according to the generated recording signal.

The optical head 13 incorporates the optical system of FIG. 1, and applies signal and reference beams for recording and reproducing to the holographic memory (disk medium) 10. The optical head 13 is arranged so that applied positions of the signal and reference beams can move on the diameter when the holographic memory 10 is fed stepwise in one diameter direction (referred to as "radial direction", hereinafter) as described below. The optical head 13 is arranged so that the signal and reference beams can be made incident from a direction vertical to this diameter (referred to as "tangential direction", hereinafter).

Figure 3:
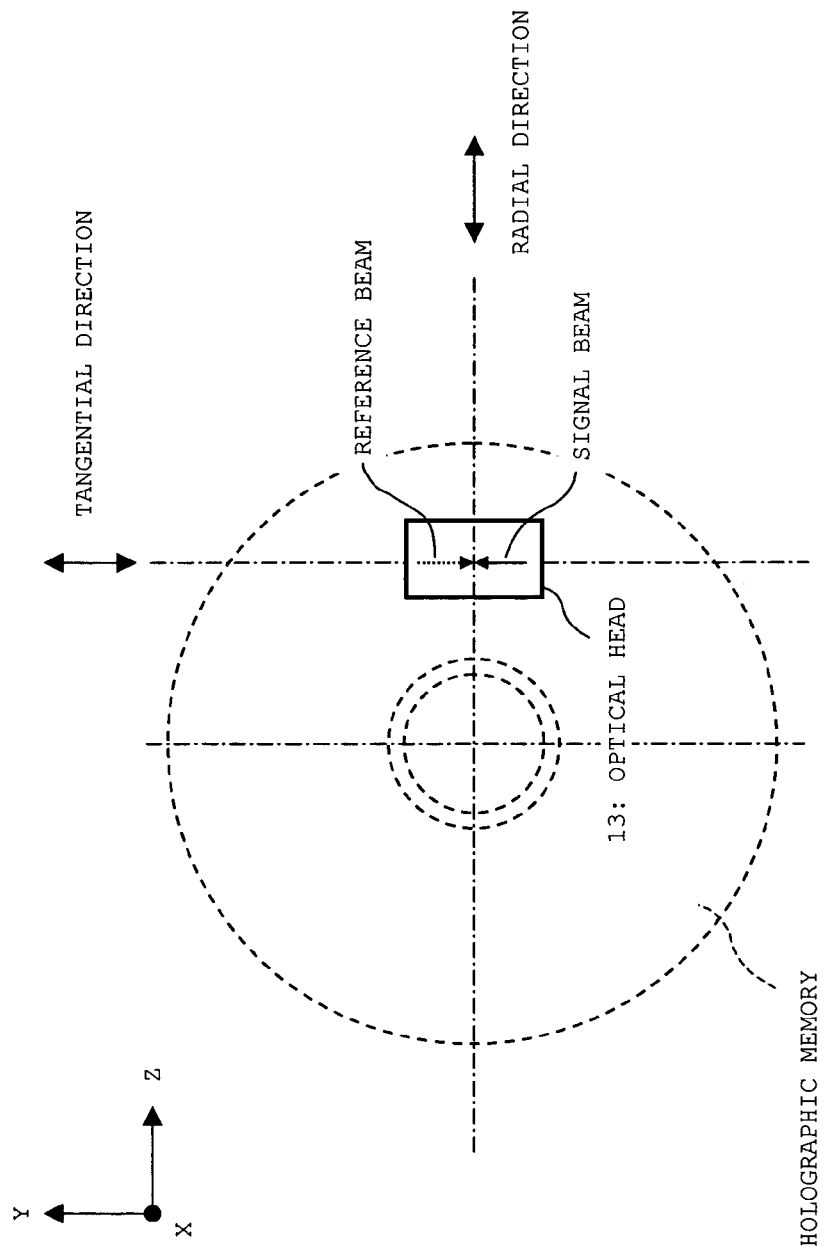
FIG. 3 shows a relationship between an optical head and a holographic memory in Embodiment 1 of the present invention.

FIG. 3 shows a relationship between the optical head 13 and the holographic memory 10. The optical head 13 is moved in a radial direction shown in FIG. 3. The signal beam and the reference beam are incident on the holographic memory 10 from a tangential direction shown in FIG. 3.

Referring back to FIG. 2, the signal amplification circuit 14 amplifies an electric signal output from the CMOS image sensor 113 in the optical head 13, and sends it to the decoder 15 and the controller 20. The decoder 15 decodes a reproduction signal input from the signal amplification circuit 14 to generate reproduction data, and sends this to a circuit of a subsequent stage.

The servo circuit 16 generates a servo signal to feed the holographic memory 10 stepwise in a disk circumferential direction according to a control command from the controller 20, and sends this to the stepping motor 17. The servo circuit 16 also generates a servo signal to feed the holographic memory 10 stepwise in a radial direction according to a control command from the controller 20, and sends this to a driving motor 18a of the feed mechanism 18. Further, the servo circuit 16 drives and controls the semiconductor laser 101 arranged in the optical head 13, controls turning ON/OFF of the shutters 103 and 105, and drives and controls the galvano mirror 110 according to control commands from the controller 20.

The servo circuit 16 generates a servo signal for correcting a tilt in an in-plane direction of an X-Z plane shown in FIG. 3, which is caused between the holographic memory 10 and the signal and reproduced beams in response to a control command from the controller 20. Hereinafter, a direction of the tilt is referred to as a "radial tilt direction" and the tilt is referred to as a "radial tilt". Then, the servo circuit 16 sends the generated servo signal to the tilt actuator 19.

The stepping motor 17 feeds the holographic memory 10 stepwise in the disk circumferential direction according to a servo signal from the servo circuit 16. The feed driving mechanism 18 slidably supports the stepping motor 17 to enable mutual movements of the optical head 13 and the holographic memory 10 in the radial direction. The motor (stepping motor) 18a provides a driving force to feed the stepping motor 17 stepwise in the radial direction.

The tilt actuator 19 is interposed between the feed mechanism 18 and the stepping motor 17 and tilts a rotational shaft of the stepping motor 17 in the radial tilt direction. The tilt actuator 19 includes a mount surface on which the stepping motor 17 is mounted, a mechanism portion capable of rotating the mount surface in the radial tilt direction, and a motor for providing a driving force for driving the mount surface in the radial tilt direction to the mechanism portion. The tilt actuator 19 can be constructed using, for example, a gonio stage.

The controller 20 controls respective parts according to a predetermined control procedure. The controller 20 corrects a tilt of the holographic memory material layer in the radial tilt direction before the recording and reproducing operations. A control operation for the correction will be described in detail later.

Next, the holographic memory 10 according to this embodiment will be described with reference to FIG. 4.

A hologram for detecting the tilt of the holographic memory material layer in the radial tilt direction (hereinafter referred to as a "reference tilt hologram") is recorded in advance on the holographic memory 10 according to this embodiment. It is preferable to record the reference tilt hologram in a position that does not affect the recording of user data, for example, an innermost circumference position or an outermost circumference position of the holographic memory 10.

Figure 4:
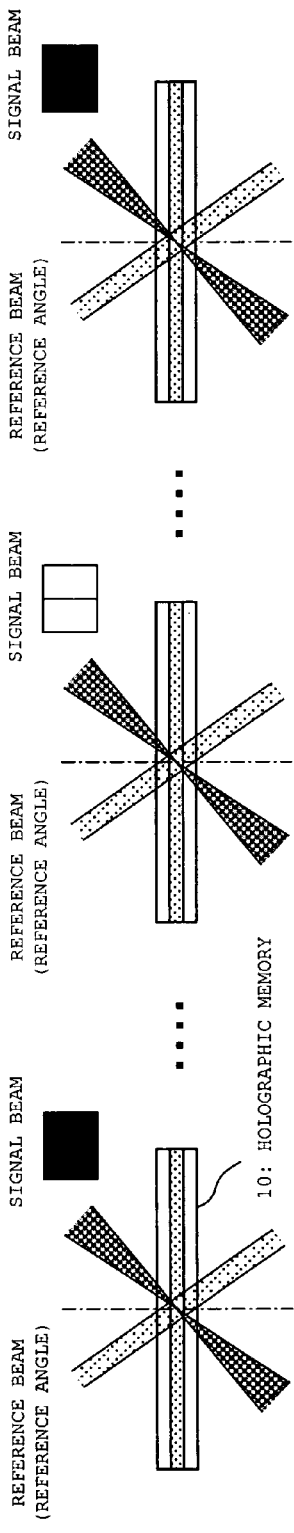
FIG. 4 shows a method of forming a reference tilt hologram in Embodiment 1 of the present invention.

Referring to an upper side of FIG. 4, a predetermined signal pattern is recorded in the holographic memory material layer by angular multiplexing to form the reference tilt hologram while each of the incident angles of the signal beam and the reference beam relative to the holographic memory material layer is tilted in the radial tilt direction by predetermined angles.

In the example shown in FIG. 4, each of the incident angles of the signal beam and the reference beam in the radial tilt direction are changed at intervals of 0.1 degrees in a range of ±2.0 degrees from the reference angle (radial tilt angle=0 degrees) at the time of angular multiplexing. Hereinafter, a difference between the reference angle and the incident angle is referred to as a "radial tilt angle". At this time, the incident angle of the reference beam in the in-plane direction of the surface including the optical axes of the reference beam and the signal beam (hereinafter referred to as a "tangential tilt direction") is maintained to a constant angle (reference angle).

A modulation pattern of the signal beam at each radial tilt angle is set with reference to a table shown in a lower side of FIG. 4. In other words, when the radial tilt angle is −2.0 degrees, the modulation pattern of the signal beam becomes a pattern in which data at each pixel position of the spatial light modulator 108 is "0". Every time the radial tilt angle is incremented from −2.0 degrees by +1 degrees, a pixel area of the spatial light modulator 108 in which data is "1" is increased from one end of the pixel area by 1/20 of the entire pixel area. When the radial tilt angle is 0 degrees, the modulation pattern of the signal beam becomes a pattern in which data at each pixel position of the spatial light modulator 108 is "1". Every time the radial tilt angle is incremented from 0 degrees by +1 degrees, the pixel area of the spatial light modulator 108 in which data is "0" is increased from the one end of the pixel area by 1/20 of the entire pixel area. When the radial tilt angle is +2.0 degrees, the modulation pattern of the signal beam becomes a pattern in which data at each pixel position of the spatial light modulator 108 is "0". A section "modulation pattern of signal beam" of the table shown in the lower side of FIG. 4 includes a schematic view showing the pixel area of the spatial light modulator 108 which is laterally extended.

When only the reference beam is allowed to enter the reference tilt hologram recorded as described above at each radial tilt angle, an intensity distribution of the modulation pattern associated with each radial tilt angle is produced on the CMOS image sensor 113. In such a case, it is necessary that the incident angle of the reference beam in the tangential tilt direction be adjusted to the incident angle (reference angle) set at the time of recording the reference tilt hologram.

Figure 5:
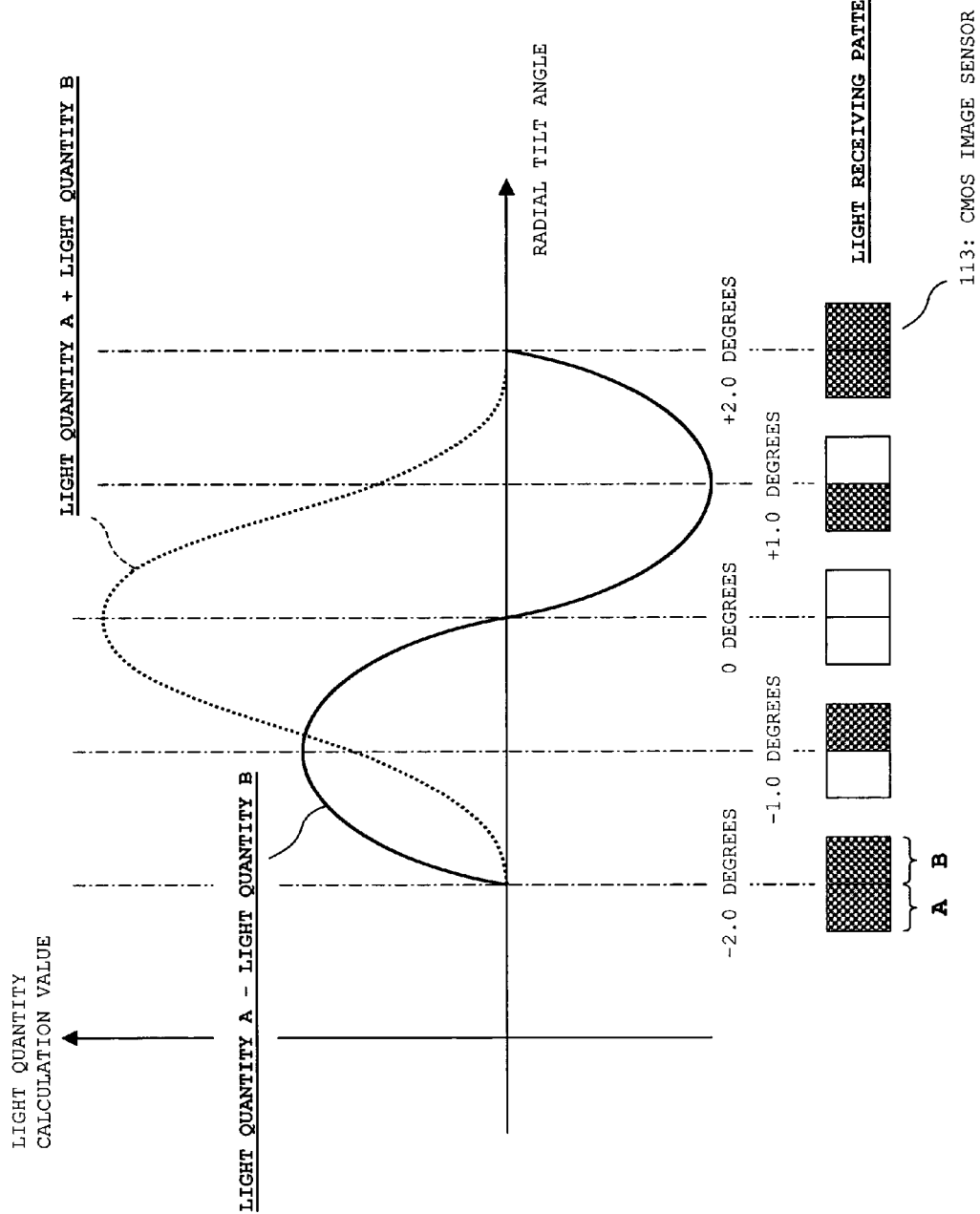
FIG. 5 is an explanatory graph showing a method of obtaining a reference angle Sr in Embodiment 1 of the present invention.

FIG. 5 shows an intensity distribution of a reproduced beam on the CMOS image sensor 113 (light receiving pattern: lower side of FIG. 5) and a result obtained by performing calculation processing on the intensity distribution using a predetermined method (light quantity calculation value) in the case where the reference beam is allowed to enter the reference tilt hologram at each radial tilt angle.

In FIG. 5, a light receiving area of the CMOS image sensor 113 is equally divided into two in a direction corresponding to a changing direction of the modulation pattern of the signal beam (extending direction of the pixel area having data "1" or "0") as shown in the table of FIG. 4. When light intensities received on respective divisional areas A and B are added to each other and subtracted from each other, respective calculated values are changed according to the radial tilt angle of the reference beam as indicated by a broken line and a solid line which are shown in FIG. 5. Here, the light intensity received on the area A is referred to as a "light quantity A" and the light intensity received on the area B is referred to as a "light quantity B".

As is apparent from such change characteristics, a radial tilt angle obtained when (light quantity A)−(light quantity B) becomes 0 and (light quantity A)−(light quantity B) becomes equal to or larger than a predetermined value (threshold value) is equal to the reference angle of the radial tilt (radial tilt angle=0 degrees) which is set at the time of forming the reference tilt hologram. Therefore, when a tilt position in the radial tilt direction in which (light quantity A)−(light quantity B) becomes 0 and (light quantity A)−(light quantity B) becomes equal to or larger than the predetermined value (threshold value) is detected during the recording and reproducing operations while the holographic memory 10 is tilted in the radial direction by the tilt actuator 19. Then, when the reference beam and the signal beam are allowed to enter the holographic memory material layer at the detected tilt position, the reference beam and the signal beam are incident on the holographic memory material layer at an angle equal to the reference angle of the radial tilt (radial tilt angle=0 degrees) which is set at the time of forming the reference tilt hologram.

Figure 6:
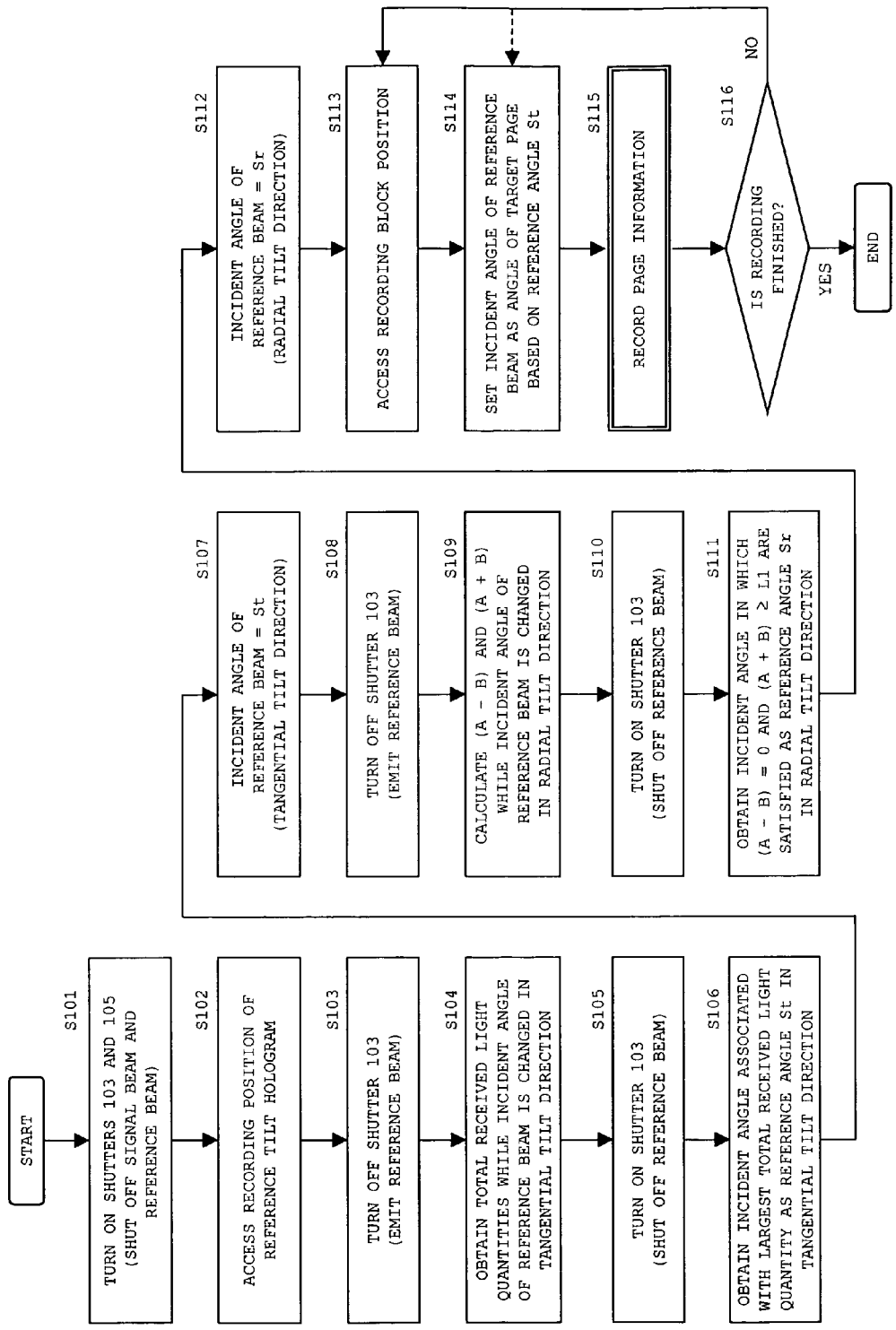
FIG. 6 is a flow chart showing a recording operation of the holographic memory device according to Embodiment 1 of the present invention.

Next, a recording operation of the holographic memory device will be described with reference to FIG. 6.

Upon the start of the recording operation, the shutters 103 and 105 are turned ON (closed) (S101) and the optical head 13 accesses a recording position of the reference tilt hologram (S102). For this access, step feeding of the holographic memory 10 (in a disk circumferential direction) is performed by the stepping motor 17 and step feeding of the holographic memory 10 (in a radial direction) is performed by the feed mechanism 18.

Then, the shutter 103 is turned OFF (opened) to emit the reference beam to the holographic memory 10 (S103). At this time, the galvano mirror 110 is rotated in a predetermined range to change the incident angle of the reference beam in the tangential tilt direction. Then, total received light quantities on the CMOS image sensor 113 at respective incident angles are successively obtained (S104).

After that, the shutter 103 is turned ON (closed) to stop the emission of the reference beam to the holographic memory 10 (S105). The total received light quantities obtained in Step S104 are compared with one another. An incident angle associated with a largest total received light quantity is obtained as the incident angle (reference angle St) corresponding to the reference angle of the reference beam in the tangential tilt direction (S106).

Next, the incident angle of the reference beam is set as the reference angle St set in Step S106 (S107) and the shutter 103 is turned OFF (opened) again to emit the reference beam to the holographic memory 10 (S108). At this time, the rotational shaft of the stepping motor 17 is rotated in a predetermined range by the tilt actuator 19 to change the incident angle of the reference beam in the radial tilt direction. Then, the received light quantities A and B (see FIG. 5) on the CMOS image sensor 113 at the respective incident angles are successively obtained and ((light quantity A)−(light quantity B)) and ((light quantity A)+(light quantity B)) are calculated for each incident angle (S109).

After that, the shutter 103 is turned ON (closed) to stop the emission of the reference beam to the holographic memory 10 (S110). Then, results obtained by calculation in Step S109 are referred to. Among the results, an incident angle in which ((light quantity A)−(light quantity B)=0) and ((light quantity A)+(light quantity B)≧L1 (L1: threshold value)) are satisfied is obtained as the incident angle (reference angle Sr) corresponding to the reference angle (radial tilt angle=0 degrees) of the reference beam in the radial tilt direction (S111).

After the reference angle Sr in the radial tilt direction is obtained as described above, the incident angle of the reference beam in the radial tilt direction is set as the reference angle Sr (S112) and the optical head 13 accesses a block position of a recording target (S113). Then, the incident angle of the reference beam in the tangential tilt direction is set as an angle of a recording target page based on the reference angle St obtained in Step S106 (S114) and recording data of a head page is recorded in a recording target block at the angle (S115). That is, after a pixel pattern corresponding to the recording data of the head page is displayed on the spatial light modulator 108, the shutters 103 and 105 are turned OFF (opened) for an exposure time period for recording.

When the recording data of the head page is recorded in the recording target block by the exposure, the controller 20 determines whether or not there is further data to be recorded (S116). When there is the data to be recorded, the galvano mirror 110 is rotated by an angle corresponding to the amount of page feeding (S114) and recording data of a next page is recorded in the recording block (S115) as in the above-mentioned processing. Data recording using the angular multiplexing is repeated until the data recording in the recording block is finished (S116).

When there is further data to be recorded after the recording in the recording block is finished, the access to a next recording block is executed (S113) and the recording in the next recording block is performed by angular multiplexing as in the above-mentioned processing (S114 to S116).

Figure 7:
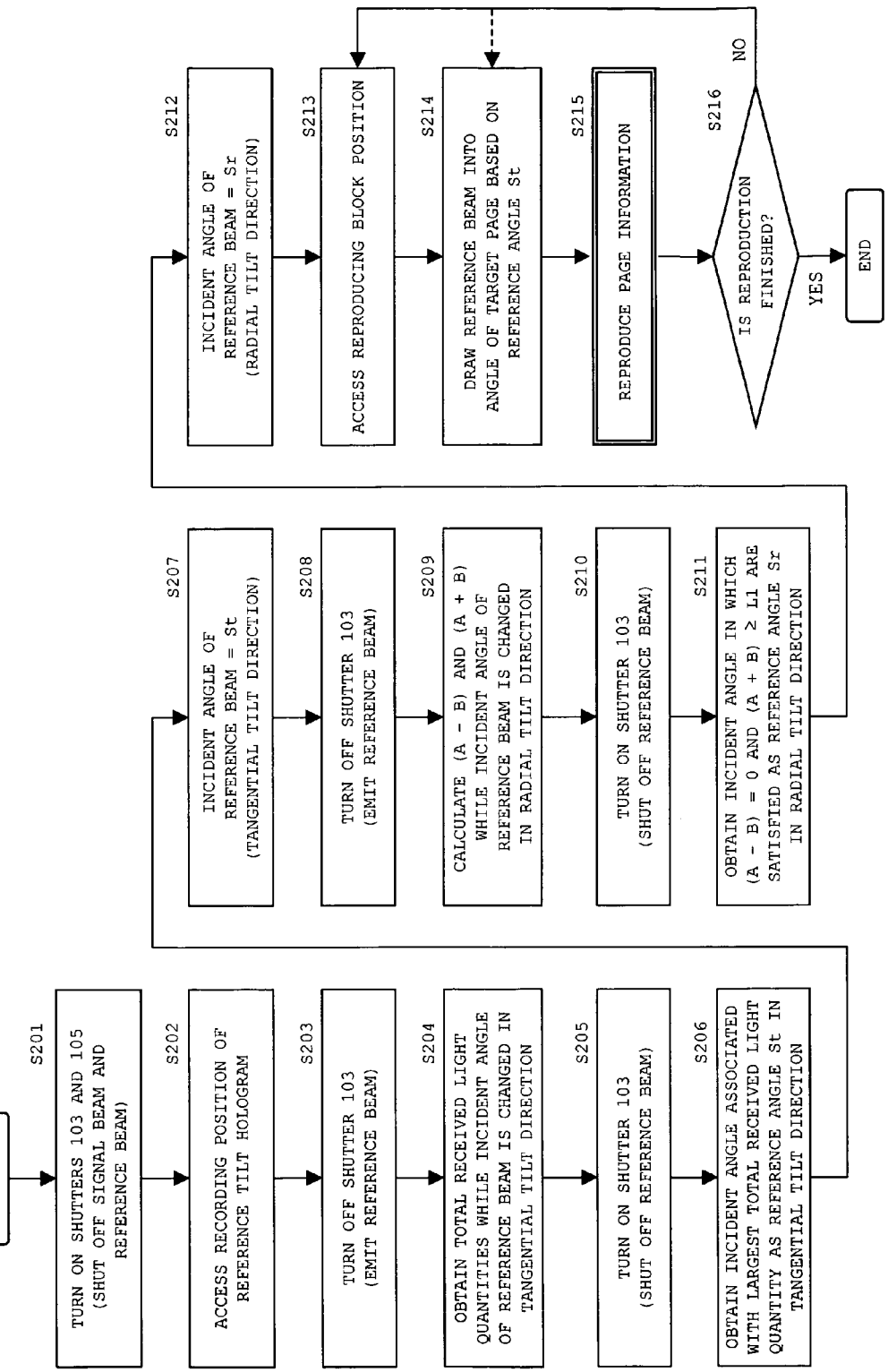
FIG. 7 is a flow chart showing a reproducing operation of the holographic memory device according to Embodiment 1 of the present invention.

Next, a reproducing operation of the holographic memory device will be described with reference to FIG. 7.

Upon the start of the reproducing operation, the shutters 103 and 105 are turned ON (closed) (S201) and the optical head 13 accesses a recording position of the reference tilt hologram (S202). After that, as in Steps S103 to S106 shown in FIG. 6, the reference angle St of the reference beam in the tangential tilt direction is obtained (S203 to S206). After the incident angle of the reference beam in the tangential tilt direction is set as the reference angle St (S207), the reference angle Sr of the reference beam in the radial tilt direction is obtained as in Steps S108 to S111 shown in FIG. 6 (S208 to S211).

After the incident angle of the reference beam in the radial tilt direction is set as the reference angle Sr (Step S112), the optical head 13 accesses a block position of a reproduction target (S213) and drawing control of the galvano mirror 110 is performed for a reproduction target page (S214). For example, the drawing control is performed as follows.

First, the shutter 103 is turned OFF (opened) to emit the reference beam to the recording block. After that, the galvano mirror 110 is rotated from an initial position in an angle direction associated with the head page (first page). The initial position of the galvano mirror 110 is set based on the reference angle St obtained in Step S206.

While the galvano mirror 110 is being rotated as described above, an output of the CMOS image sensor 113 is continuously monitored. An angle position of the galvano mirror 110 in which a first peak of the output appears is detected as the angle position associated with the head page (first page).

After such detection, the galvano mirror 110 is further rotated by the amount of page feeding necessary to reach the reproduction target. In addition, the galvano mirror 110 is finely adjusted to a position in which the output of the CMOS image sensor 113 becomes maximum. Therefore, a tilt terror between the reproduction target page in the tangential tilt direction and the reference beam is corrected to draw the galvano mirror 110 to the angle position associated with the reproduction target page. When the drawing for the reproduction target page is finished, the shutter 103 is turned ON (closed).

After that, the shutter 103 is turned OFF for an exposure time for reproduction to perform reproduction processing on the reproduction target page (S215). When the reproduction processing on the reproduction target page is finished, the controller 20 determines whether or not the reproduction of all pages to be reproduced as targets is finished (S216). When there is a further page to be reproduced in the recording block, processing returns to Step S214 and the drawing processing and the reproduction processing (S215) are performed for a target page. When there is a further page to be reproduced in another recording block, processing returns to Step S213. Then, the access to the recording block of the reproduction target is executed and the drawing processing (S214) and the reproduction processing (S215) are performed for a reproduction target page.

In this embodiment, the tilt correction in the radial tilt direction is performed using the reference tilt hologram before the recording and reproducing operations. Therefore, smooth recording and reproducing operations can be realized.

At the time of the tilt correction, the reference angle St in the tangential tilt direction is obtained. In this embodiment, the incident angle of the reference beam in the tangential tilt direction at the time of recording is set based on the reference angle St (S114 in FIG. 6). Therefore, a relationship between the incident angle of the reference beam in the tangential tilt direction at the time of recording and the reference angle of the reference beam in the tangential tilt direction which is obtained using the reference tilt hologram is not changed among different holographic memories. Thus, when the reference angle St is obtained at the time of reproduction as in this embodiment (S214 in FIG. 7) and an initial angle for page drawing is set based on the reference angle St, it is possible to set the initial angle to a value adequate for a mounted holographic memory, with a result that speedy and smooth drawing processing can be performed for the reproduction target page.

Embodiment 2

In Embodiment 1, the incident angle of the reference beam in the tangential tilt direction is maintained to the reference angle St to form the reference tilt hologram. Then, the total received light quantity is detected for each incident angle while the incident angle of the reference beam in the tangential tilt direction is changed relative to the reference tilt hologram. An incident angle associated with a largest total received light quantity is obtained as the reference angle St in the tangential tilt direction.

On the other hand, in this embodiment, a reference tilt hologram for obtaining the reference angle St (hereinafter referred to as a "Tn-reference tilt hologram") is formed in the holographic memory in addition to the reference tilt hologram described in Embodiment 1 (hereinafter referred to as particularly a "Ra-reference tilt hologram" in this embodiment).

As in the case of the Ra-reference tilt hologram, it is preferable to form the Tn-reference tilt hologram in a position that does not affect the recording of user data, for example, an innermost circumference position or an outermost circumference position of the holographic memory 10.

FIG. 8 shows a method of forming the Tn-reference tilt hologram.

Referring to an upper side of FIG. 8, a predetermined signal pattern is recorded in the holographic memory material layer by angular multiplexing to form the Tn-reference tilt hologram while the incident angle of the reference beam relative to the holographic memory material layer is tilted in the tangential tilt direction by a predetermined angle.

In the example shown in FIG. 8, the incident angle of the reference beam in the tangential tilt direction are changed at intervals of 0.01 degrees in a range of ±0.2 degrees from the reference angle (tangential tilt angle=0 degrees) at the time of angular multiplexing. (Hereinafter, a difference between the reference angle and the incident angle is referred to as a "tangential tilt angle".) At this time, the incident angle of the reference beam in the radial tilt direction is maintained to a constant angle (reference angle).

A modulation pattern of the signal beam at each tangential tilt angle is set with reference to a table shown in a lower side of FIG. 8. In other words, when the tangential tilt angle is −0.2 degrees, the modulation pattern of the signal beam becomes a pattern in which data at each pixel position of the spatial light modulator 108 is "0". Every time the tangential tilt angle is incremented from −0.2 degrees by +0.01 degrees, a pixel area of the spatial light modulator 108 in which data is "1" is increased from one end of the pixel are a by 1/20 of the entire pixel area. When the tangential tilt angle is 0 degrees, the modulation pattern of the signal beam becomes a pattern in which data at each pixel position of the spatial light modulator 108 is "1". Every time the tangential tilt angle is incremented from 0 degrees by +0.01 degrees, the pixel area of the spatial light modulator 108 in which data is "0" is increased from the one end of the pixel area by 1/20 of the entire pixel area. When the tangential tilt angle is +0.2 degrees, the modulation pattern of the signal beam becomes a pattern in which data at each pixel position of the spatial light modulator 108 is "0". A section "modulation pattern of signal beam" of the table shown in the lower side of FIG. 8 includes a schematic view showing the pixel area of the spatial light modulator 108 which is laterally extended.

When only the reference beam is allowed to enter the Tn-reference tilt hologram recorded as described above at each tangential tilt angle, an intensity distribution of the modulation pattern associated with each tangential tilt angle is produced on the CMOS image sensor 113. In such a case, it is necessary that the incident angle of the reference beam in the radial tilt direction be adjusted to the incident angle (reference angle) set at the time of recording the Tn-reference tilt hologram. When the intensity distribution of the beam received by the CMOS image sensor 113 is processed as in the case shown in FIG. 5, the reference angle St in the tangential tilt direction can be obtained.

The reference angle Sr in the radial tilt direction is obtained by the same processing as that in Embodiment 1 using the Ra-reference tilt hologram.

Figure 9:
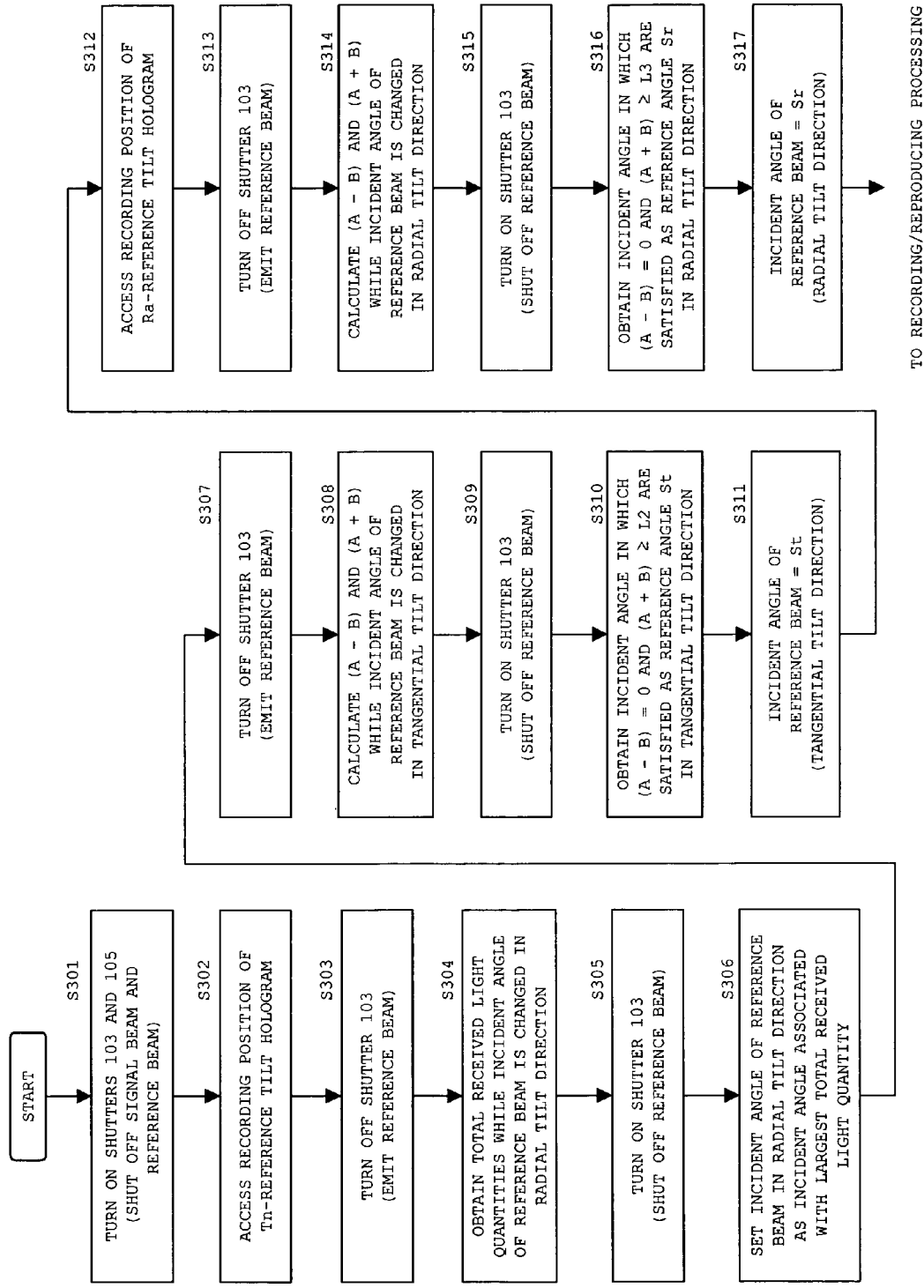
FIG. 9 is a flow chart showing processing for obtaining reference angles St and Sr in Embodiment 2 of the present invention.

FIG. 9 is a processing flow chart showing processing for obtaining and setting the reference angles St and Sr. This processing is performed before the recording and reproducing operations.

Upon the start of the processing, the shutters 103 and 105 are turned ON (closed) (S301), and the optical head 13 accesses a recording position of the Tn-reference tilt hologram (S302). Next, the shutter 103 is turned OFF (opened) to emit the reference beam to the holographic memory 10 (S303). At this time, the rotational shaft of the stepping motor 17 is rotated in a predetermined range by the tilt actuator 19 to change the incident angle of the reference beam in the radial tilt direction. Then, the total received light quantities on the CMOS image sensor 113 at the respective incident angles are successively obtained (S304).

After that, the shutter 103 is turned ON (closed) to stop the emission of the reference beam to the holographic memory 10 (S305). The total received light quantities obtained in Step S304 are compared with one another. The incident angle of the reference beam is set as an incident angle associated with a largest total received light quantity (S306).

Next, the shutter 103 is turned OFF (opened) again to emit the reference beam to the holographic memory 10 (S307). At this time, the galvano mirror 110 is rotated in a predetermined range to change the incident angle of the reference beam in the tangential tilt direction. Then, the received light quantities A and B (see FIG. 5) on the CMOS image sensor 113 at the respective incident angles are successively obtained, and ((light quantity A)−(light quantity B)) and ((light quantity A)+(light quantity B)) are calculated for each incident angle (S308).

After that, the shutter 103 is turned ON (closed) to stop the emission of the reference beam to the holographic memory 10 (S309). Then, results obtained by calculation in Step S308 are referred to. Among the results, an incident angle in which ((light quantity A)−(light quantity B)=0) and ((light quantity A)+(light quantity B)≧L2 (L2: threshold value)) are satisfied is obtained as the incident angle (reference angle Sr) corresponding to the reference angle of the reference beam in the tangential tilt direction (S310).

After the reference angle St in the tangential tilt direction is obtained as described above, the incident angle of the reference beam in the tangential tilt direction is set as the reference angle St. Then, the optical head 13 accesses a position of the Ra-reference tilt hologram. After that, the shutter 103 is turned OFF again (opened) to emit the reference beam to the holographic memory 10 (S313). At this time, the rotational shaft of the spindle motor 17 is rotated in a predetermined range by the tilt actuator 19 to change the incident angle of the reference beam in the radial tilt direction. Then, the received light quantities A and B (see FIG. 5) on the CMOS image sensor 113 at the respective incident angles are successively obtained, and ((light quantity A)−(light quantity B)) and ((light quantity A)+(light quantity B)) are calculated for each incident angle (S314).

After that, the shutter 103 is turned ON (closed) to stop the emission of the reference beam to the holographic memory 10 (S315). Then, results obtained by calculation in Step S109 are referred to. Among the results, an incident angle in which ((light quantity A)−(light quantity B)=0) and ((light quantity A)+(light quantity B)≧L3 (L3: threshold value)) are satisfied is obtained as the incident angle (reference angle Sr) corresponding to the reference angle of the reference beam in the radial tilt direction (S316).

After the reference angle Sr in the radial tilt direction is obtained as described above, the incident angle of the reference beam in the radial tilt direction is set as the reference angle Sr (S317). Then, the optical head 13 accesses a block position of the recording target or a block position of the reproduction target. After that, the same recording and reproducing operations as those in Embodiment 1 are executed.

According to this embodiment, the reference angle St of the reference beam in the tangential tilt direction is obtained using the Tn-reference tilt hologram, so the reference angle St can be obtained with higher precision than that in Embodiment 1. Because the precision of the reference angle St is improved, the reference angle Sr of the reference beam in the radial tilt direction can be smoothly obtained with high precision while the incident angle of the reference beam in the tangential tilt direction is set as the reference angle St, as compared with the case of Embodiment 1.

Embodiment 3

In Embodiment 2, each of the reference angles St and Sr is obtained by the method shown in FIG. 5. On the other hand, in Embodiment 3, each of the reference angles St and Sr is obtained with reference to the total received light quantities obtained while the reference beam is changed in the tangential tilt direction and the radial tilt direction.

In this embodiment, in forming the reference tilt hologram, the incident angle of the reference beam is maintained to a reference angle without being changed in the tangential tilt direction and in the radial tilt direction. The reference beam is allowed to enter at the reference angle to record only one kind of signal pattern (any pattern is allowed). Therefore, the reference tilt hologram is formed in the holographic memory 10.

Figure 10:
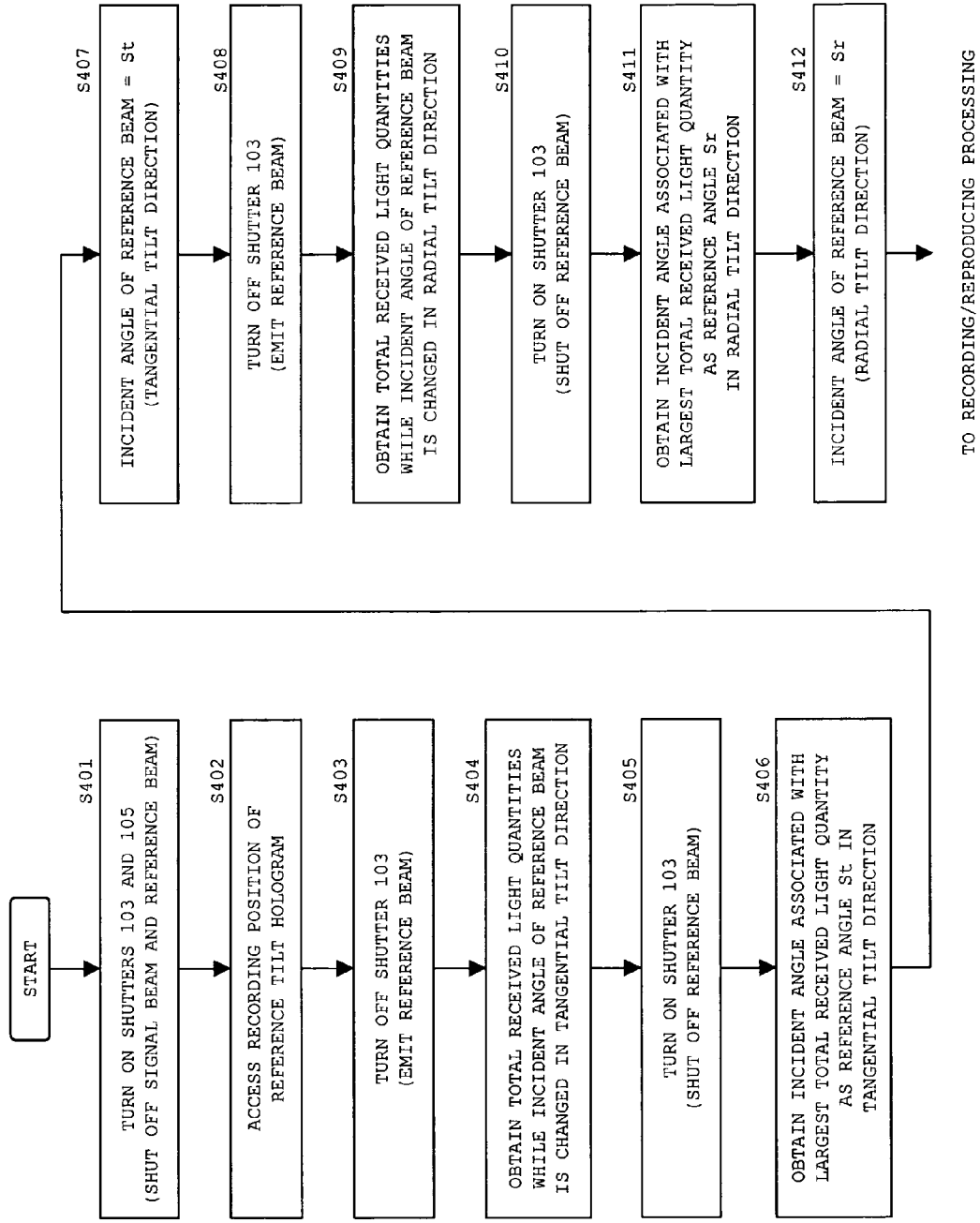
FIG. 10 is a flow chart showing processing for obtaining the reference angles St and Sr in Embodiment 3 of the present invention.
Figure 12A:
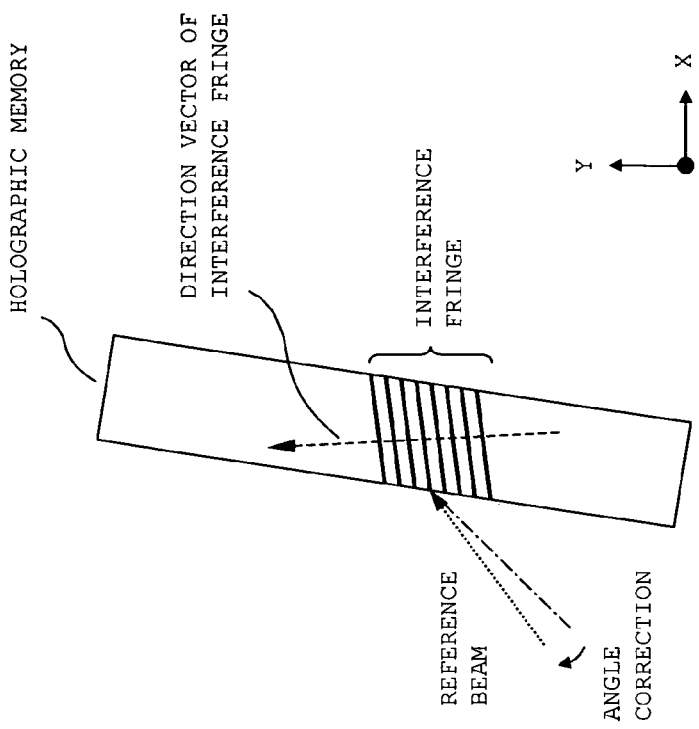
FIGS. 12A and 12B are explanatory diagrams showing a relationship between an interference fringe and a tilt.
Figure 12B:
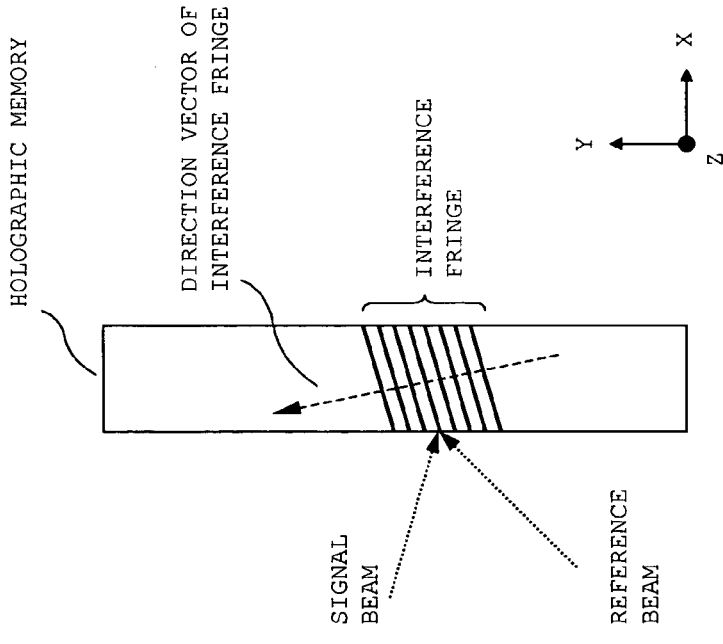

FIG. 10 is a processing flow chart showing processing for obtaining and setting the reference angles St and Sr. This processing is performed before the recording and reproducing operations.

Upon the start of the processing, the shutters 103 and 105 are turned ON (closed) (S401) and the optical head 13 accesses a recording position of the reference tilt hologram (S402). Next, the shutter 103 is turned OFF (opened) to emit the reference beam to the holographic memory 10 (S403). At this time, the galvano mirror 110 is rotated in a predetermined range to change the incident angle of the reference beam in the tangential tilt direction. Then, the total received light quantities on the CMOS image sensor 113 at the respective incident angles are successively obtained (S404).

After that, the shutter 103 is turned ON (closed) to stop the emission of the reference beam to the holographic memory 10 (S405). The total received light quantities obtained in Step S404 are compared with one another. An incident angle associated with a largest total received light quantity is obtained as the incident angle (reference angle St) corresponding to the reference angle of the reference beam in the tangential tilt direction (S406).

Next, the incident angle of the reference beam is set as the reference angle St set in Step S106 (S407), and then the shutter 103 is turned OFF (opened) again to emit the reference beam to the holographic memory 10 (S408). At this time, the rotational shaft of the spindle motor 17 is rotated in a predetermined range by the tilt actuator 19 to change the incident angle of the reference beam in the radial tilt direction. Then, the total received light quantities on the CMOS image sensor 113 at the respective incident angles are successively obtained (S409).

Next, the shutter 103 is turned ON (closed) to stop the emission of the reference beam to the holographic memory 10 (S410). The total received light quantities obtained in Step S409 are compared with one another. An incident angle associated with a largest total received light quantity is obtained as the incident angle (reference angle Sr) corresponding to the reference angle of the reference beam in the radial tilt direction (S411). The incident angle of the reference beam in the radial tilt direction is set as the reference angle Sr (S412). Then, the optical head 13 accesses a block position of the recording target or a block position of the reproduction target. After that, the same recording and reproducing operations as those in Embodiment 1 are executed.

According to this embodiment, the structure of the reference tilt hologram can be simplified. In addition, it is possible to simply obtain and set the reference angles St and Sr.

The embodiments of the present invention have been described. Needless to say, however, those embodiments are in no way limitative of the invention, and various changes can be made.

For example, a light source for emitting the signal beam and the reference beam is not limited to the semiconductor laser 101. It may be, e.g., an SHG laser.

The shutters 103 and 105 are not limited to the mechanical shutters, but they may be liquid crystal shutters.

The spatial light modulator 108 is not limited to the combination of the liquid crystal and the mirror, but it may be a DMD (Digital Micro-mirror Device). For the spatial light modulator 108, a light transmissive spatial light modulator made of a liquid crystal alone can be used. In this case, the spatial light modulator is arranged in a latter part of the shutter 105 in the optical system of FIG. 1.

The incident position of the reference beam can be adjusted by combining two or more mirrors in place of the relay lens 111.

The photodetector for detecting an interference light is not limited to the CMOS image sensor 113. For example, it may be a CCD image sensor.

The multiplexing method is not limited to the angular multiplexing. Another multiplexing method or a combination of various multiplexing methods may be employed.

The radial stepwise-feeding of the holographic memory 10 is not limited to the configuration of feeding the stepping motor 17 stepwise. It is possible to use a configuration of feeding the optical head 13 in the radial direction of the holographic memory 10.

In this embodiment, the stepping motor 17 is driven in the radial tilt direction by the tilt actuator 19. The optical head 13 may be driven in the radial tilt direction.

In this embodiment, the modulation pattern of the signal beam (pixel area in which data is "0" and pixel area in which data is "1") is changed as shown in FIG. 4. The modulation pattern of the signal beam may be changed as shown in FIGS. 11A to 11C. In each of FIGS. 11A to 11C, a hatched region indicates the pixel area in which data is "0". In such a case, the light receiving area of the CMOS image sensor 113 is divided as shown in a right side of each of FIGS. 11A to 11C. The received light quantity of the area A (light quantity A) and the received light quantity of the area B (light quantity B) are calculated as in the case shown in FIG. 5. The reference angles St and Sr are obtained based on a result obtained by the calculation as described in Embodiments 1 to 3.

The reference tilt hologram may be recorded in advance on the holographic memory by a holographic memory maker. Alternatively, the reference tilt hologram may be recorded by a user side, rather than the maker. The user may record the reference tilt hologram in the holographic memory in a holographic memory device of the user upon performing first recording.

Each of the embodiments is directed to the holographic memory device which uses the transmissive holographic memory. However, the present invention can be applied to a reflective holographic memory device.

When processing for fixing the interference fringe is necessary, fixing processing is executed after the recording operation as occasion demands. For this fixing processing, a method of using a reference beam as a beam for fixing, and various other methods such as a method of separately arranging a dedicated laser beam can be used.

Various changes can be made to the embodiments of the present invention within a scope of technical ideas described in appended claims as occasion demands.

What is claimed is:

1. A holographic memory medium, characterized in that reference information for specifying an incident angle of a reference beam or incident angles of the reference beam and a signal beam in a predetermined direction is recorded based on a hologram principle, wherein first reference information for specifying an incident angle of an emitted laser beam in a first direction and second reference information for specifying an incident angle of an emitted laser beam in a second direction different from the first direction are recorded in positions different from each other based on the hologram principle, and wherein the first direction is an in-plane direction of a surface including optical axes of the reference beam and the signal beam and the second direction is an in-plane direction of a surface perpendicular to the surface including the optical axes of the reference beam and the signal beam.

2. A holographic memory medium, characterized in that reference information for specifying an incident angle of a reference beam or incident angles of the reference beam and a signal beam in a predetermined direction is recorded based on a hologram principle, wherein first reference information for specifying an incident angle of an emitted laser beam in a first direction and second reference information for specifying an incident angle of an emitted laser beam in a second direction different from the first direction are recorded in positions different from each other based on the hologram principle, and wherein the first reference information is recorded on the holographic memory medium by multiple-recording plural kinds of signal patterns changed depending on an angle in a first area while the angle is changed in the first direction and the second reference information is recorded on the holographic memory medium by multiple-recording plural kinds of signal patterns changed depending on an angle in a second area while the angle is changed in the second direction.

* * * * *